United States Patent [19]
Strom et al.

[11] Patent Number: 5,323,899
[45] Date of Patent: Jun. 28, 1994

[54] CASE FOR VIDEO PROBE

[75] Inventors: John R. Strom; Michael C. Stone, both of Skaneateles; Joseph A. Ciarlei, Marcellus, all of N.Y.

[73] Assignee: Welch Allyn, Inc., Skaneateles Falls, N.Y.

[21] Appl. No.: 69,427

[22] Filed: Jun. 1, 1993

[51] Int. Cl.⁵ .............................................. B65D 85/00
[52] U.S. Cl. ...................................... 206/363; 128/4; 128/6; 206/305
[58] Field of Search ..................... 206/363, 305; 128/4, 128/6; 362/32

[56] References Cited

U.S. PATENT DOCUMENTS

| | | |
|---|---|---|
| 752,889 | 2/1904 | Dieckmann . |
| 2,397,975 | 4/1946 | Obermaier . |
| D. 260,617 | 9/1981 | Lawson, II et al. . |
| 2,924,495 | 2/1960 | Haines . |
| D. 318,627 | 7/1991 | Frederick . |
| 3,665,991 | 5/1972 | Gillemot et al. . |
| 4,170,234 | 10/1979 | Graham ........................... 206/363 X |
| 4,256,225 | 3/1981 | Jackson ........................... 206/363 X |
| 4,658,956 | 4/1987 | Takeda et al. . |
| 4,933,816 | 6/1990 | Hug et al. . |

*Primary Examiner*—Bryon P. Gehman
*Attorney, Agent, or Firm*—Harris Beach & Wilcox

[57] ABSTRACT

A case of the type for carrying and using an instrument having an insertion tube, a control handle, and a light box having therein a fan, the case comprising a body with a removable cover, a primary cavity in the body for snugly receiving the light box therein, oriented so that controls on the light box are accessible to a user, a secondary cavity in the body for receiving a control handle attached to the insertion tube therein, and a coil of tubular material, having a low coefficient of friction, positioned within the secondary cavity, and having an open proximal end into which the insertion tube can be slidably received for storage. The case is structured to promote cooling the of light box.

7 Claims, 8 Drawing Sheets

CASE FOR VIDEO PROBE

BACKGROUND OF THE INVENTION

This invention relates to a case for carrying and using an instrument having control handle, insertion tube and light box containing a fan. More particularly this invention relates to a case for safely carrying a video probe intended for field use, wherein the probe instrument may be used with a light box and optional measurement box being either in the case or removed from the case.

SUMMARY OF THE INVENTION

Video probe instruments such as, for example, borescopes are frequently used in the inspection of regions that are inaccessible either for structural or safety reasons. Such regions include pipes, jet engines, conduits of nuclear power plants and the like. Because such inspections are frequently carried out with the area to be inspected being in situ it is often necessary that the borescope be brought to the site to be inspected and used in the field.

When bringing a borescope to a field site for use, a number of requirements and problems present themselves. First and foremost, since borescopes tend to be quite expensive and yet delicate instruments, they must be transported in a manner which ensures their safety and the integrity of their components. This requires that the borescope be packed in a manner which minimizes possible trauma to the instrument from such sources as sudden movement and/or impact to the case in which the borescope is held. It is also desirable that the case be relatively lightweight and not contain an excess of heavy protective material as it may have to be carried long distances and should be capable of being ported by a single person.

In addition, depending upon the preferences of the instrument user and upon the field conditions, it may be appropriate to use the borescope with the light box and an optional measurement box being located either outside of or inside of the case. In the latter situation, it is necessary that the heat generated by the battery operation of the light box be directed out of the case, or excessive heat buildup may occur. It is, of course, also necessary that those portions of the light box and measurement box which must be adjusted or observed be readily accessible to a user.

It is also desirable that the instrument can be unpacked from and packed into the case speedily and efficiently, and in a manner that will minimize the possibility of damage to its parts. This is especially true with respect to the bendable parts, in particular the insertion tube which can be damaged by being kinked, stretched or otherwise subject to rough handling in the attempt to fit it into a case and/or during transportation of the case.

It is common in the art for carrying cases to be compartmentalized, frequently having different compartments sized to accommodate the larger, and generally inflexible components, which are often in the form of rectangular boxes. However, more flexible components, such as cords and insertion tubes, tend to be housed in a single large compartment which is either rectangular or of a "leftover" shape (that is whatever cavity is left over after housing the other parts of the instrument) or in smaller rectangular compartments.

Prior art carrying cases tended either to be general purpose or to be adapted to specific instruments or groups of instruments. Examples of these are U.S. Pat. No. 2,924,495 for a case for electronic gauges, U.S. Pat. No. 752,889 for a microscope case, U.S. Pat. No. 4,933,816 for a case for forensic inspection/detection systems, U.S. Pat. No. 4,658,956 for a case for audio-visual sensory apparatus, and U.S. Patent No. 2,397,975 for a pyrometer case. None of these cases meets the requirements for carrying and possibly using a borescope type instrument, as described above.

It is therefore a primary object of the present invention to provide a case of the type for carrying and using an instrument having an insertion tube, a control handle and a light box containing a fan as well as an optional measurement box.

It is another object of the present invention to provide a case of the type for carrying and using an instrument having light and measurement boxes, an insertion tube, and a control handle which can be easily and rapidly packed and unpacked.

It is still another object of the present invention to provide a case of the type for carrying and using an instrument having light and measurement boxes, an insertion tube, and a control handle which is lightweight, compact, and protects the instruments contained therein during the transportation process.

It is still another object of the present invention to provide a case of the type for carrying and using an instrument having light and measurement boxes, an insertion tube, and a control handle wherein the light and measurement boxes may be used inside or outside of the case.

It is a further object of the present invention to provide a case of the type for carrying and using an instrument having light and measurement boxes, an insertion tube, and a control handle in which flexible parts, particularly the insertion tube may be stored rapidly and with minimal risk of damage.

These and other objects of the present invention are attained by a case of the type for carrying and using an instrument having an insertion tube, a control handle, a light box containing a fan and an optional measurement box. The case has a body with a removable cover, a primary cavity in the body in which the light and measurement boxes or a light box and dummy fit snugly, with the primary cavity being oriented so that controls on the light and measurement boxes are accessible to a user. The case also contains a secondary cavity in its body for receiving a control handle attached to the insertion tube, ventilation means for cooling the light box, and a coil of tubular material, having a low coefficient of friction, positioned within the secondary cavity, and having an open proximal end into which the insertion tube can be slidably received for storage.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
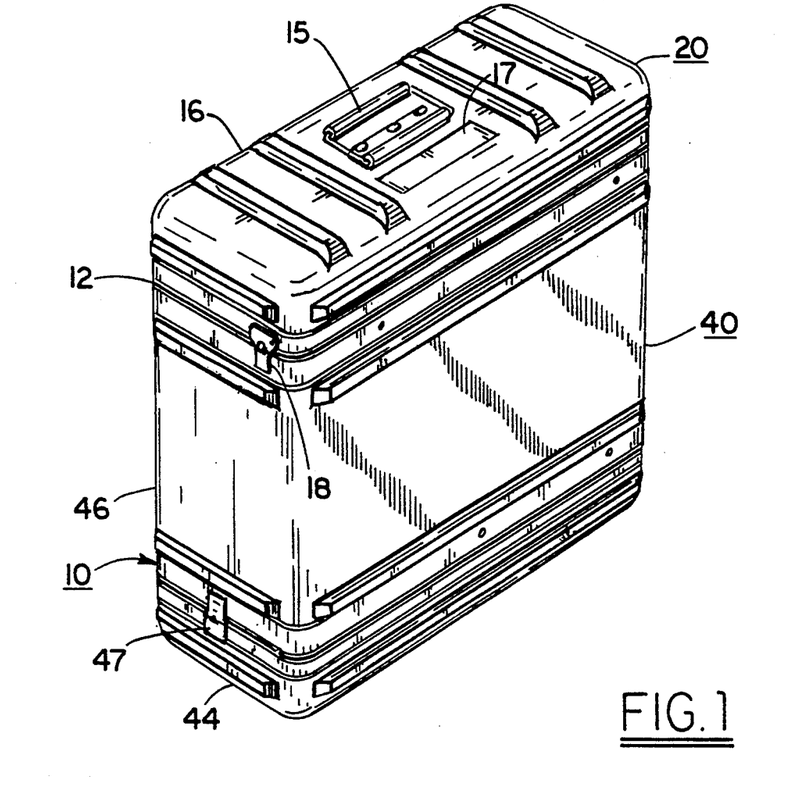
FIG. 1 is a perspective view of the case of the instant invention.
Figure 2:
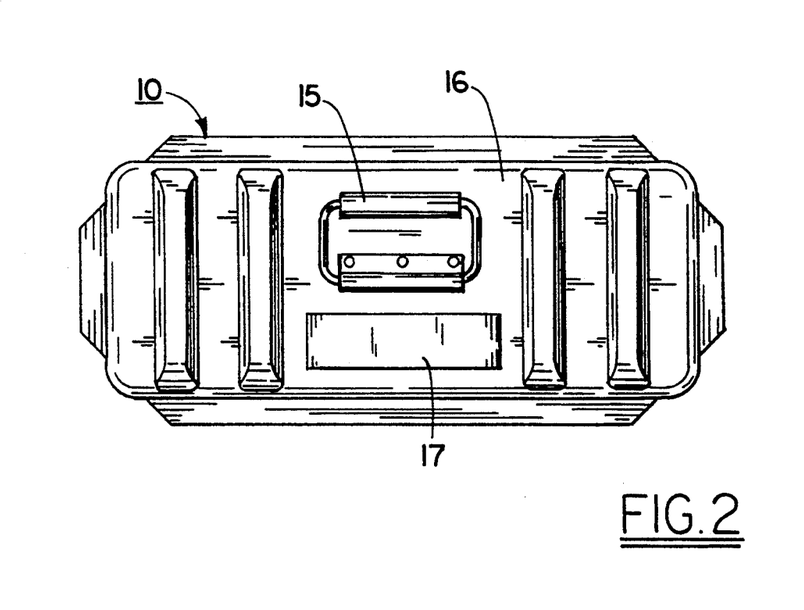
FIG. 2 is a top view of the case of FIG. 1.
Figure 3:
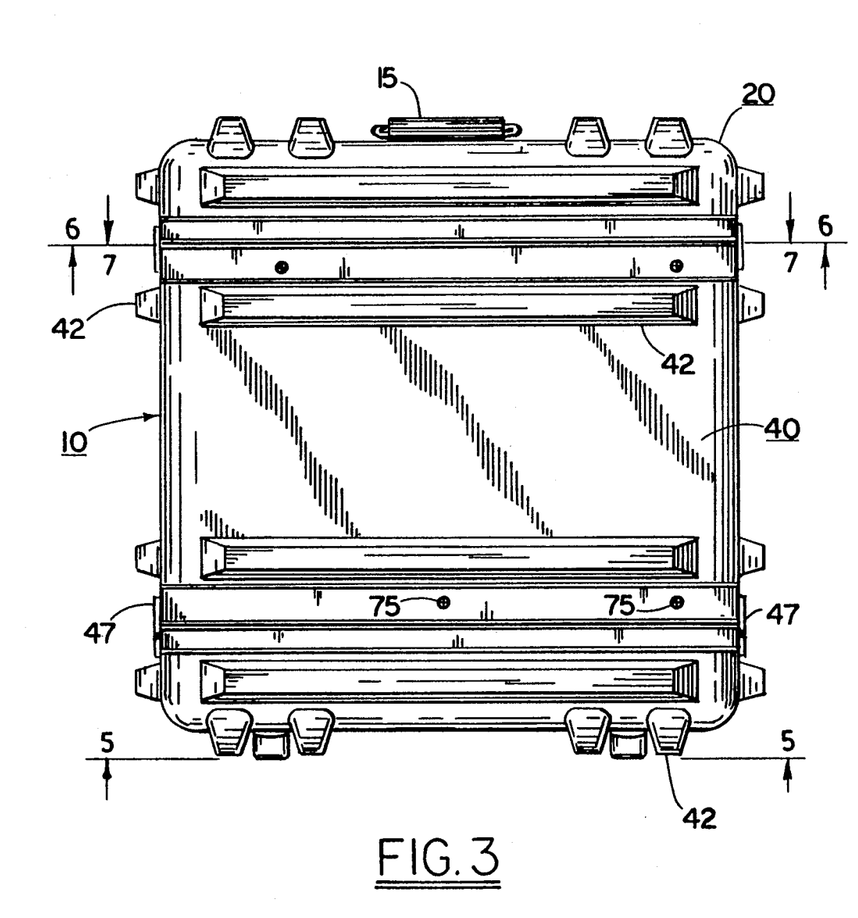
FIG. 3 is a front view of the case of FIG. 1, the rear view being a mirror image thereof.
Figure 4:
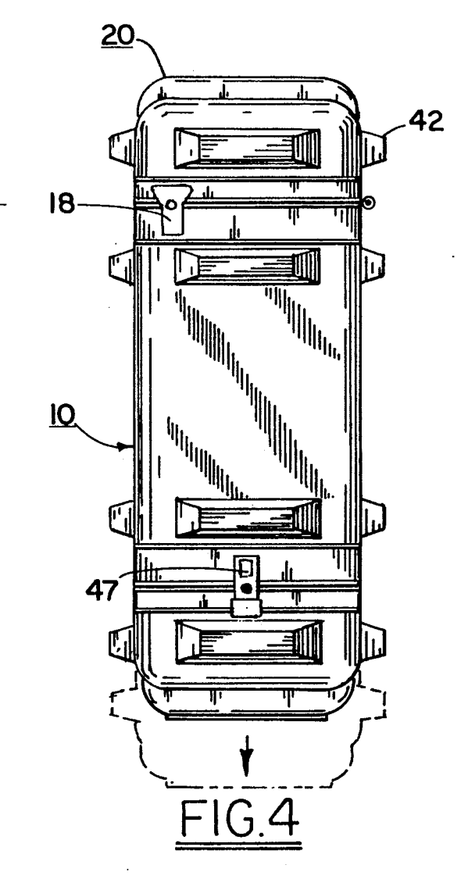
FIG. 4 is a side view of the case of FIG. 1.
Figure 5:
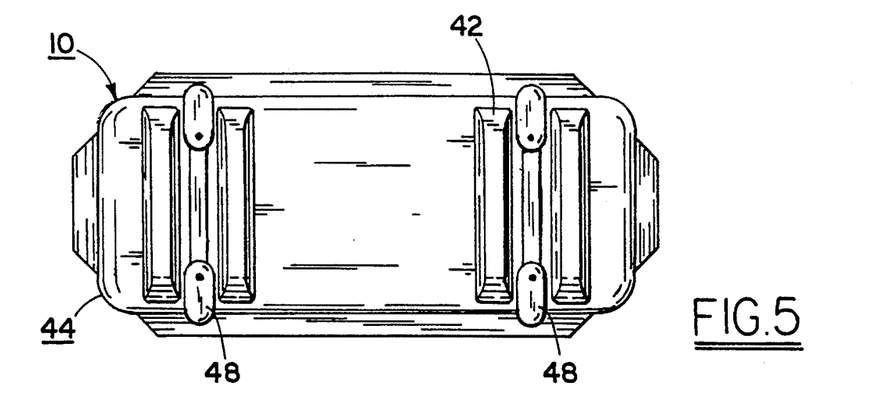
FIG. 5 is a bottom view of the case of FIG. 1.
Figure 6:
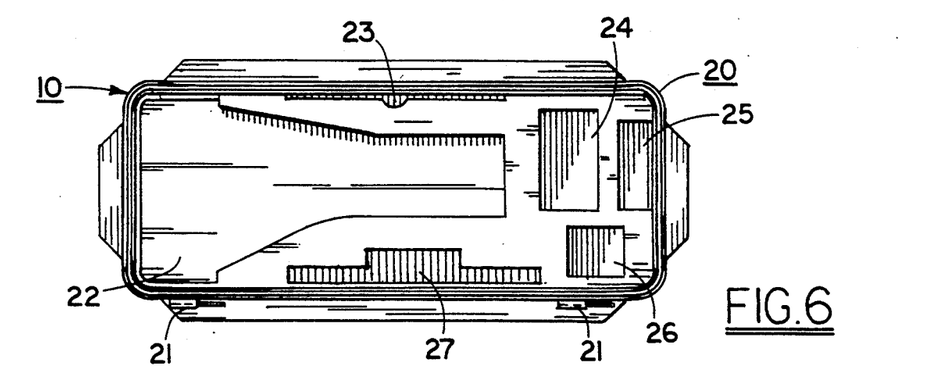
FIG. 6 is a cross sectional view of the preferred embodiment of the empty case of the instant invention taken along line 6—6 of the top section looking upward.
Figure 7:
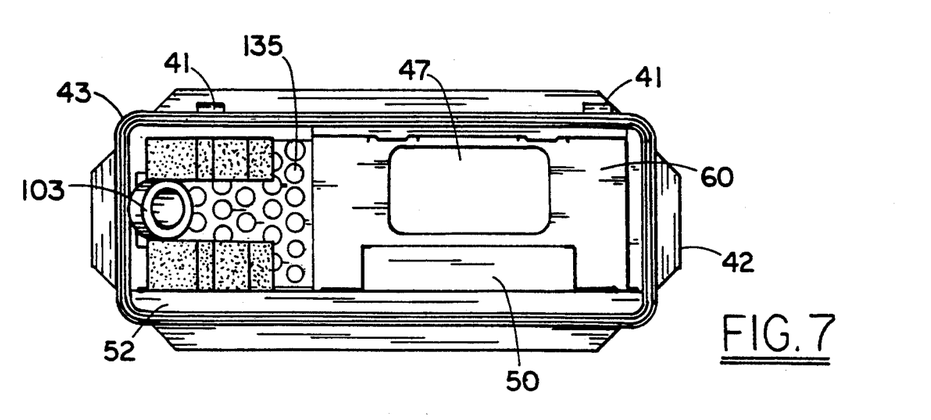
FIG. 7 is a cross sectional view of the empty case of FIG. 3 taken along line 5—5 of the bottom section looking downward.

Referring now to FIGS. 1-5, the exterior of the preferred embodiment of the case 10 of the instant invention is shown. As can be seen, the case 10 consists of two main portions. The first is a bottom portion 40 in which the primary instrument parts are stored for transportation, and in which the light and measurement boxes may repose while being used. The second is a top portion 20 which rests snugly on the bottom portion at position 12 and is held onto the bottom portion 40 when fully closed via latches with butterfly closures 18—18, one being on each side of the case. The top portion 20 is removably attached to the bottom portion along the back edge 43 via take-apart hinges 21—21 in the top portion 20 and 41—41 in the bottom portion 40, as shown in FIGS. 6 and FIG. 7. The box is generally rectangular in cross section and is intended to be both used and carried with its height being the greatest dimension, and with the cover on top.

The bottom section 44 of bottom portion 40 is also removably attached to the top section 46 of bottom portion 40 for the purpose of servicing. The two parts are held together via latches 47—47 and can be disassembled using phillips screwdrivers. Heavy duty valences 77 are pressed into the perimeter of the top section of the bottom portion, adding structural strength to the case.

The exterior of the case contains a number of bumpers 42, at least one bumper being present on each surface, although more are preferable. These bumpers help protect the case and its contents against damage by impact against hard external objects. On the bottom surface of the case, as shown in FIG. 5, extra feet 48—48 help insure stability of the case when set down on a surface.

The top surface 16 of the top portion of the case contains a carrying handle 15 and a small indentation 17 which can be used for the retention of an identifying label (not shown).

Figure 8:
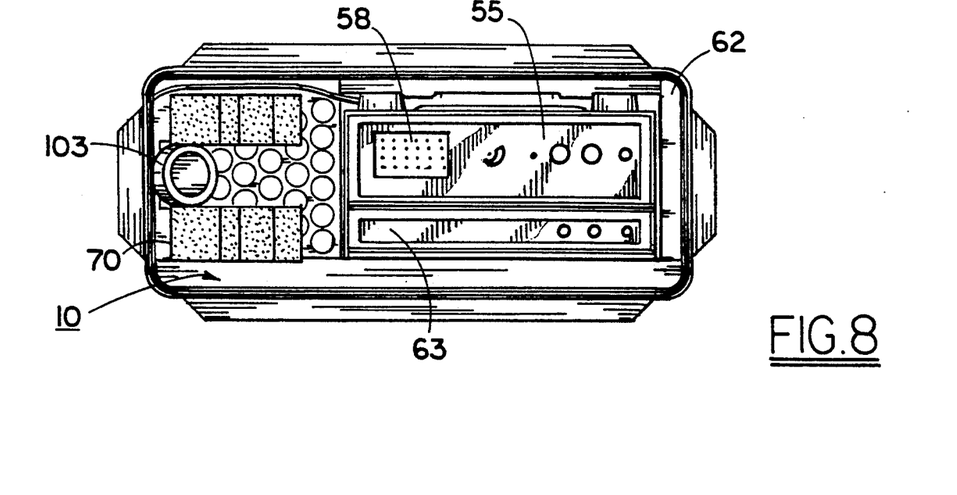
FIG. 8 is a cross sectional view of the case of FIG. 3 taken along line 5—5 of the bottom section looking downward, having the light and measurement box in place.
Figure 9:
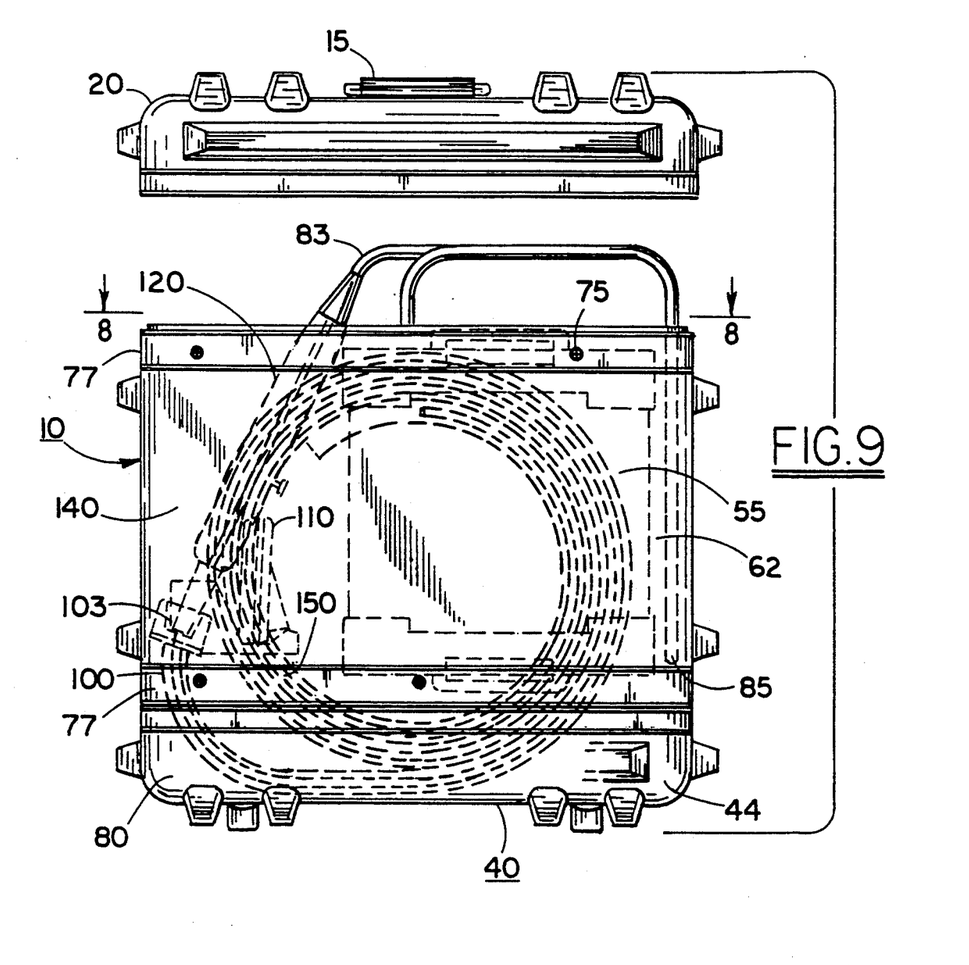
FIG. 9 is a frontal exploded view of the case of FIG. 3 showing the instrument contained therein in phantom.

Referring now to FIGS. 8 and 9, there is shown the interior body of the case is divided into four regions. The first region, primary cavity 70 slidably receives light box 55 and measurement box 63 which are normally held together as a single unit by rubber bumpers (not shown). Both light box 55 and measurement box 63 are generally rectangular in cross section and have height as their greatest dimension. The light box 55 has controls on its top face. If the measurement box 63 is not used then a dummy block 50, shown in FIG. 7, may be inserted to assure a snug fit of the light box 55 within the case 10.

The second region, secondary cavity 140 holds the control handle 120 of the borescope which, in turn, is attached to the insertion tube 150 which fits inside insertion tube guide 100 which is the subject of copending application U.S. Ser. No. 991,135 by Joseph A. Ciarlei to a common assignee. The insertion tube guide 100 comprises the third major region in the bottom section 40 of case 10.

The last major region is a bottom cavity 80 which is empty, but serves in the transfer of heat from the light box 55 out of case 10 as will be described below. FIG. 7 shows the bottom panel 60 which separates primary cavity 70 from bottom cavity 80.

The control handle 120 has attached to it the handle power cord 83 which is plugged into light box socket 58. In the preferred embodiment, as shown in FIG. 9, the light box socket 58 is adjacent the secondary cavity 140 which allows a minimal bend radius of the control handle power cord 83, and facilitates the packing of the case 10.

Additional, smaller cavities in the bottom portion are intended to hold various cords as needed. Power cord cavity 62 holds the power cord to the light box. The terminal end 85 of control handle power cord 83 is stored inside cavity 70.

FIG. 6 shows the top portion 20 of the case, serving as a storage unit for accessories as well as having a first cover cavity 22 cut out to accommodate the control handle 120 and associated handle power cord 83 which jut above the top surface of the bottom portion 40 of the case. The second cover cavity 23 accommodates the manual, and a third cover cavity 24 a visor which serves to protect the view screen on the control handle from glare. The fourth cover cavity 25 accommodates the box for the side view mirror, an accessory which may be attached near the head of the borescope, a fifth cover cavity 26 the spare lamp and a sixth cover cavity 27 the shoulder strap and automatic measurement system (a.m.s.) cables for communication between the light box and the optional measurement box.

Figure 11:
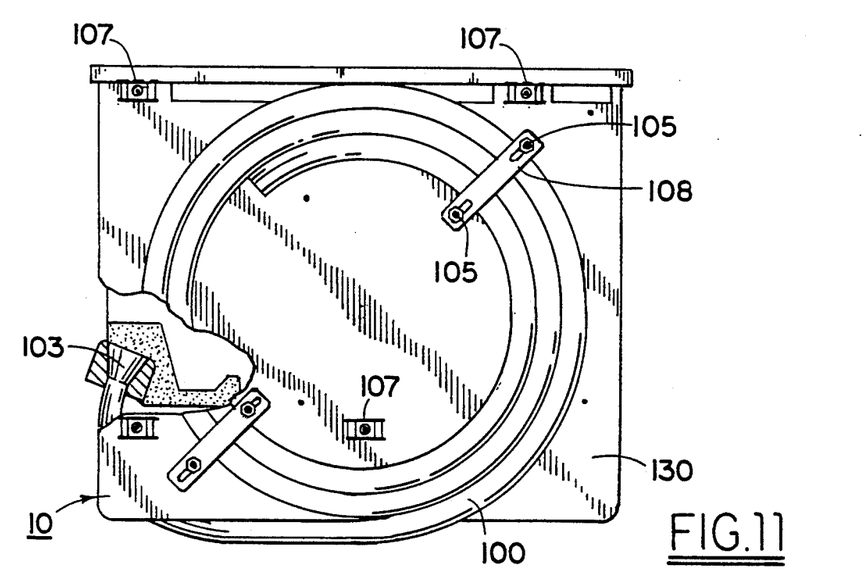
FIG. 11 is a side view of a first interior subassembly part of the case of FIG. 3, with a portion cut away to show the mouth of the insertion tube coil.

Storage of the control handle 120 and insertion tube 150 in the case can be better understood by reference to FIGS. 9 and 11. The insertion tube guide 100 is formed of a coil of tubular material which has a low coefficient of friction. The insertion tube 150 of the borescope is inserted into the mouth 103 of the insertion tube guide and fed into the guide. Because of the low coefficient of friction, the insertion tube 150 slips smoothly along the curves of the coil shaped guide and is thus stored in a compact manner in a predefined space without crimping. The control handle 120 rests against and is stabilized by a conformingly shaped piece of foam material 115. The insertion tube guide 100 is held in position against metal sheeting 130 by a pair of brackets 108—108. Each bracket 108, is in turn, fixed to the metal sheeting 130 by a pair of bolts 105—105, with one bolt on each side of the insertion tube guide 100.

Figure 10:
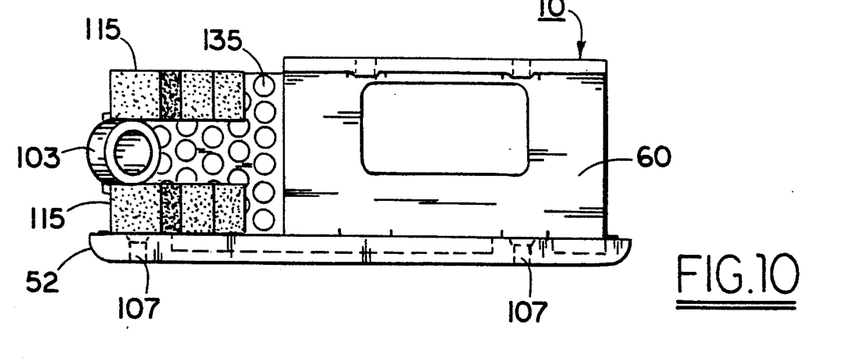
FIG. 10 is a top view of a first interior subassembly part of the case of FIG. 3.
Figure 12:
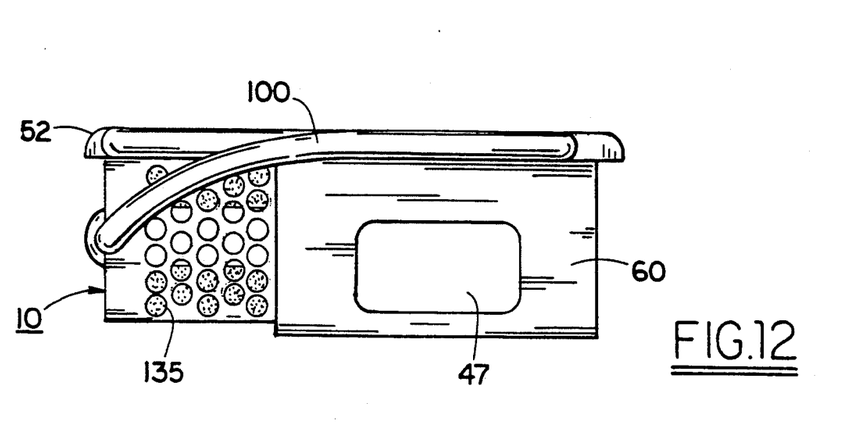
FIG. 12 is a bottom view of the subassembly part of FIG. 10.
Figure 13:
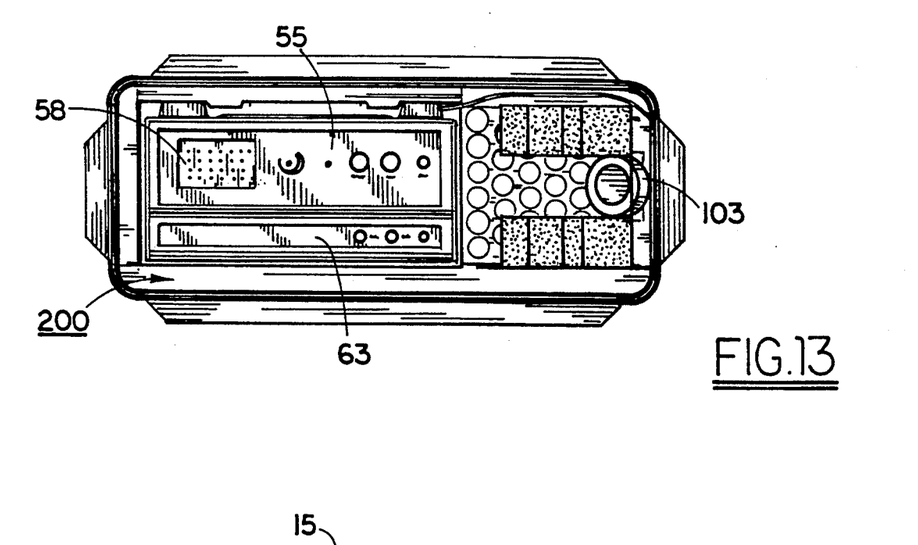
FIG. 13 is a cross sectional view of a second embodiment of the case of the instant invention, taken along line 5—5 of the bottom section, having the light and measurement box in place.
Figure 14:
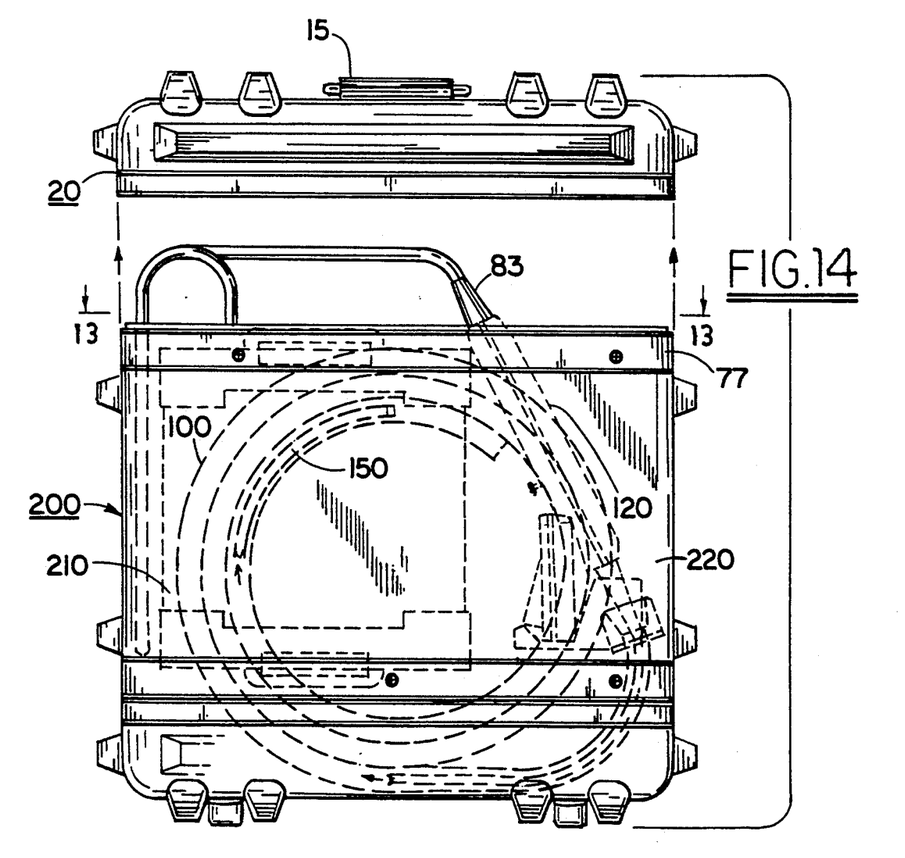
FIG. 14 is a frontal exploded view of the case of FIG. 13 showing the instrument contained therein in phantom.
Figure 15:
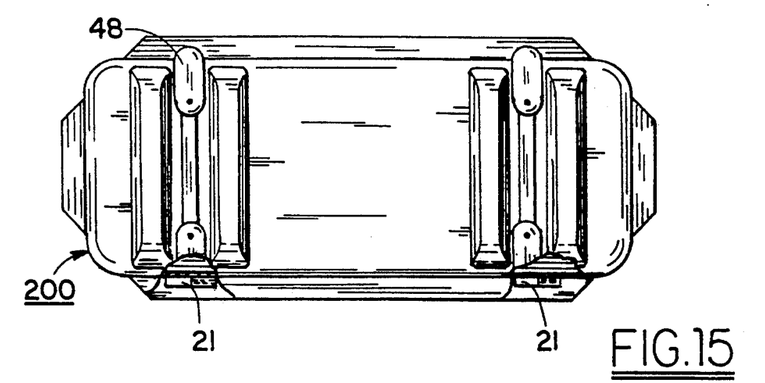
FIG. 15 is a top view of the case of FIG. 13 with a section partially cut away to show the top hinges.
Figure 16:
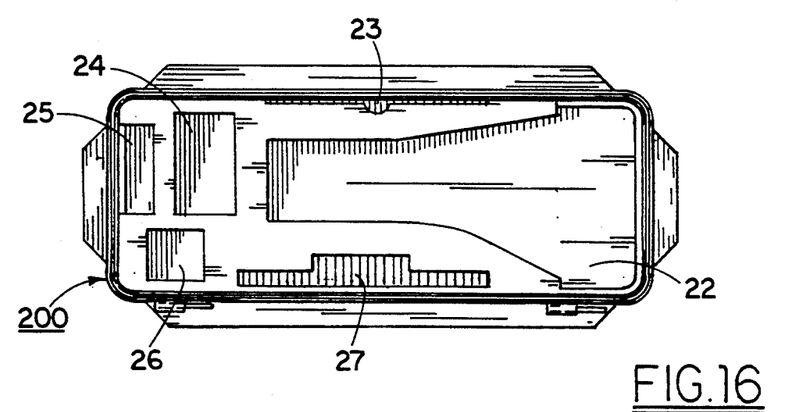
FIG. 16 is a cross sectional view of the empty case of FIG. 13 taken along line 6—6 of the top section.
Figure 17:
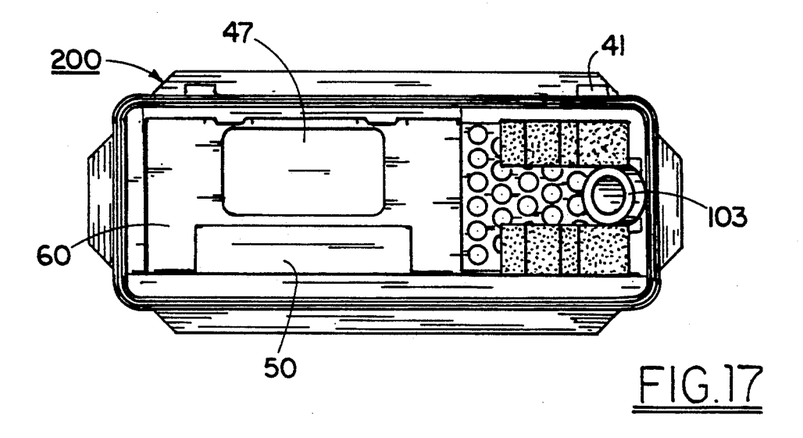
FIG. 17 is a cross sectional view of the empty case of FIG. 13 taken along line 5—5 of the bottom section.
Figure 18:
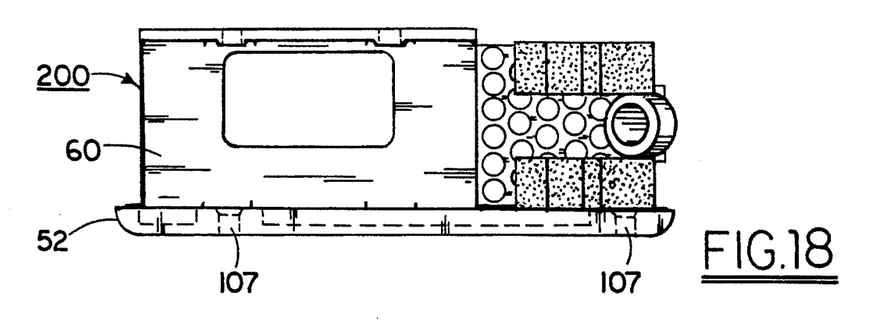
FIG. 18 is a top view of a first interior subassembly part of the case of FIG. 13.
Figure 19:
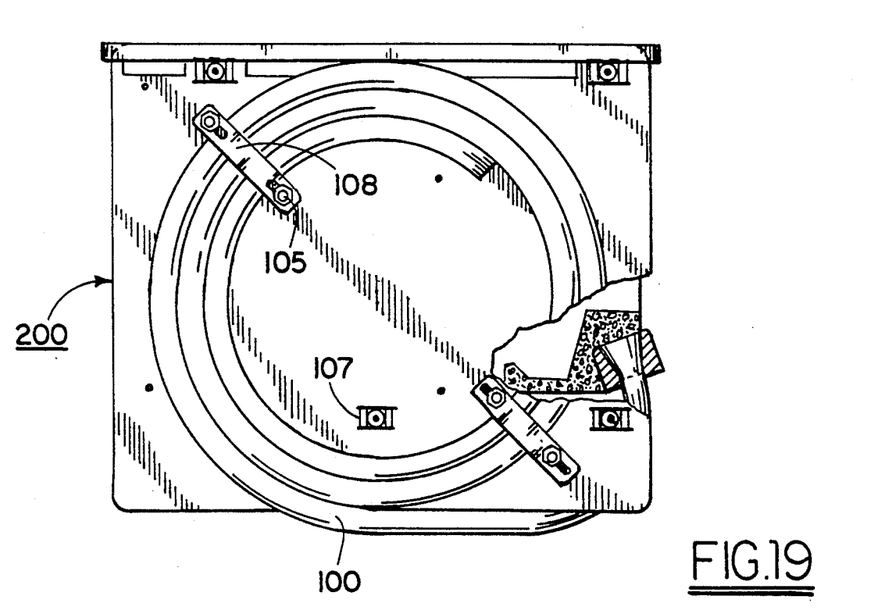
FIG. 19 is a side view of a second interior subassembly part of the case of FIG. 13, with a portion cut away to show the mouth of the insertion tube coil.
Figure 20:
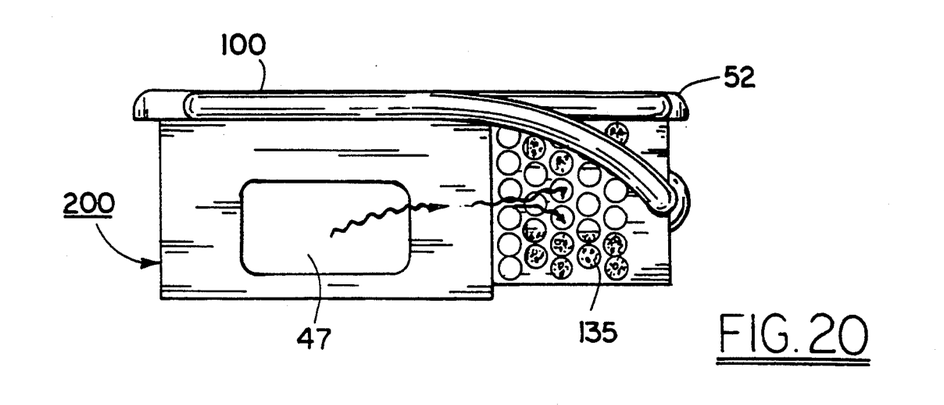
FIG. 20 is a bottom view of the subassembly part of FIG. 18.

As the light box 55 of a borescope generates heat in use, it is necessary to cool the light to prevent its breaking. This is done via a fan (not shown) in the light box which fan, in turn, requires venting. Venting is accomplished in the instant case 10 by the creation of bottom cavity 80 by means of bottom panel 60 shown in FIGS. 10 and 11. The bottom panel 60 contains a cutout 47 which is positioned so that it rests under the fan of light box 55. It also contains a plurality of exhaust apertures 135 in the area beneath the secondary cavity 140. The exhaust apertures 135 are sized so that air may pass through freely while support is still provided to the control handle 120 and insertion tube guide 100. Thus the primary cavity 70 is in fluid communication with the bottom cavity 80 and hence with the secondary cavity 140. As can be seen from FIG. 12, air from the fan in the light box 55 is thus blown into bottom cavity 80 and up through exhaust apertures 135 into secondary cavity 140 which, when the borescope is in use in the field, it is in contact with the external environment by virtue of the cover being removed.

The case contains additional elements to help protect its contents against damage. Shock mounts 107, which comprise pieces of rubber with threaded inserts that are designed to cushion the instrument within the case, are strategically positioned throughout the case, being held to metal sheeting 130 which, in turn is held to the case by screws 75. Strips of rubber 52 are also used as cushioning along edges and cover the shock mounts (See FIG. 10). In addition, the foam material 115 already described, is used to cushion and support the control handle 120.

An alternate embodiment 200 of the invention, shown in FIGS. 13-20, uses the same external case and the same internal components. The positions of the primary cavity 210 and the secondary cavity 220 are exchanged, however. In this configuration, the light box socket 58 is not adjacent the secondary cavity 220 resulting in a greater bend radius of the control handle power cord 83 so that packing is not as easy as in the preferred embodiment.

It is easily understood by one skilled in the art that some of the specific elements of this invention such as latches, hinges and foam padding can be replaced by equivalent elements without detracting from the utility of the case. While this invention has been explained with reference to the structure disclosed herein, it is not confined to the details set forth and this application is intended to cover any modifications and changes as may come within the scope of the following claims:

What is claimed is:

1. A case for carrying and using an instrument having a control handle, an insertion tube, and a light box, said light box having a fan therein, the case comprising:
    a body having a removable cover;
    a primary cavity in said body for snugly receiving a light box therein, said cavity being oriented so that controls on a received light box are accessible to a user;
    a secondary cavity in said body for receiving therein a control handle attached to an insertion tube;
    a tubular coil of material having a low coefficient of friction positioned within said secondary cavity, the tubular coil having an open proximal end into which an insertion tube can be slidably received for storage; and
    means for cooling a light box.

2. The case of claim 1 wherein an instrument to be stored therein further comprises a measurement box and said primary cavity receives a measurement box, said primary cavity being oriented so that controls on the measurement box contained therein are accessible to a user.

3. The case of claim 1 wherein a control handle to be stored therein has a three branched power cord, having a first branch attached to a control handle, a second branch detachably pluggable into a light box, and a third branch reversibly pluggable into a power source, and said body further comprises:
    a control handle power cord cavity for containing therein a third branch of a control handle power cord; and
    a light box power cord cavity for containing therein a power cord to a light box.

4. The case of claim 1, being generally rectangular in cross section and having height as its greatest dimension and depth as its smallest dimension, and oriented so that said cover is on top and so that it receives a light box that is generally rectangular in cross section, having controls on its top face and having height as its greatest dimension in such as orientation that controls on a light box face said cover.

5. The case of claim 1 having said secondary cavity proximate said primary cavity.

6. The case of claim 1 wherein said means for cooling a light box comprises:
    a bottom cavity, into which said coil of tubular low friction material extends, said bottom cavity being partitioned from said primary and secondary cavities by a bottom panel, said bottom panel having a cutout portion therethrough to said primary cavity which cutout portion is sized to receive a light box fan; and
    said bottom panel having exhaust apertures therethrough to said secondary cavity, placing said bottom cavity in fluid communication with said second cavity
    whereby a light box fan received by the cut out portion forces air through the cutout portion, into the bottom cavity, through the exhaust apertures, and through the secondary cavity, thus directing heat from a received light box of the case.

7. The case of claim 1 wherein said cover contains a plurality of cover cavities to accommodate one or more of the group comprising: a portion of a control handle power cord, a manual, a visor, a box for a side view mirror, a spare lamp, a shoulder strap, and communication cables for linking a light box to a measurement box.

* * * * *

UNITED STATES PATENT AND TRADEMARK OFFICE
CERTIFICATE OF CORRECTION

| | | |
|---|---|---|
| PATENT NO. | : 5,323,899 | Page 1 of 1 |
| APPLICATION NO. | : 08/069427 | |
| DATED | : June 28, 1994 | |
| INVENTOR(S) | : John R. Strom, Michael C. Stone and Joseph A. Ciarlei | |

It is certified that error appears in the above-identified patent and that said Letters Patent is hereby corrected as shown below:

Column 6, Line 61. Please insert the word --out-- after the word "box".

Signed and Sealed this

Twentieth Day of February, 2007

JON W. DUDAS
*Director of the United States Patent and Trademark Office*